Dec. 24, 1929. G. R. RICH 1,740,666
COMPOSITE METAL VALVE TAPPET
Original Filed Oct. 8, 1927
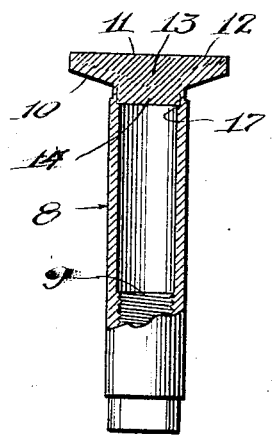
Fig. 1.
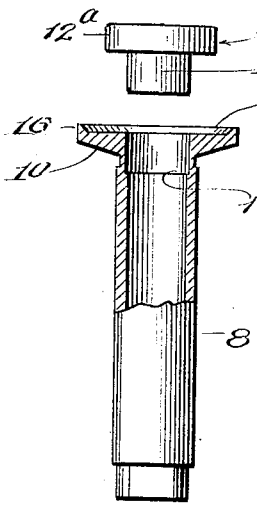
Fig. 2.
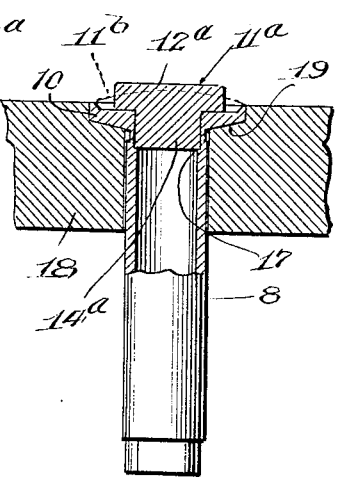
Fig. 4.
Fig. 3.
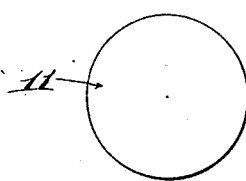
Fig. 5.
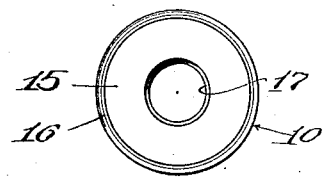
Fig. 6.
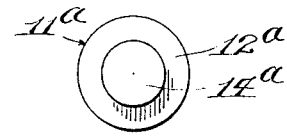
Fig. 7.
Inventor:
George R. Rich
by Charles O. Shervey
his Atty.

Patented Dec. 24, 1929

1,740,666

UNITED STATES PATENT OFFICE

GEORGE R. RICH, OF BATTLE CREEK, MICHIGAN, ASSIGNOR TO WILCOX-RICH CORPORATION, OF DETROIT, MICHIGAN, A CORPORATION OF MICHIGAN

COMPOSITE-METAL VALVE TAPPET

Original application filed October 8, 1927, Serial No. 224,999. Divided and this application filed October 31, 1928. Serial No. 316,335.

The subject matter of the specification has been divided out of my prior application for patent on Composite metal valve tappets, filed October 8, 1927, under Serial No. 224,999.

This invention relates to composite metal articles of manufacture, such as valve tappets and valves for internal combustion engines.

It relates more particularly to composite metal articles of manufacture, comprising a hollow steel shank or stem portion having a head thereon, formed with a cast iron or white iron surface portion. One of the objects of the present invention is the production of hollow tappets and analogous metal articles composed of a hollow steel shank and an iron cam contacting surface portion integrally united in a homogenous mass. Another object is the production of composite metal articles of manufacture composed of a hollow steel shank and head having a white iron facing integrally united with the head so as to form a homogeneous mass.

The desirability of forming a valve tappet with a cast iron or white iron cam contacting surface is well recognized, and I have heretofore produced tappets of this type, of which one is shown and described in my prior United States Patent No. 1,628,911, dated May 17, 1927. The desirability of a hollow tappet having a shank formed with a very thin wall or shell is apparent, but considerable difficulty has been encountered in attempting to fuse cast iron to the head portion of a hollow tappet because of the difficulty in holding the cast iron over the hole in the tappet while in a molten state. In the manufacture of steel tappets having a cast iron or white iron cam contacting surface portion, an electric arc welding process is usually used for melting the cast iron and fusing it to the steel head portion of the tappet, and because of the exceedingly high temperature used in the fusing process, it was found that any material that was placed in the hollow portion of the tappet for the purpose of supporting the molten metal would melt during the welding process and permit the molten cast iron to escape through the hollow tappet.

In accordance with the present invention, I place a cast iron plug in the end of the hollow tappet and support the plug therein, so that it will not fall therethrough by gravity, and then heat the plug with an arc welding tool or other suitable heating element and melt the upper portion of the plug, permitting the melted portion to flow upon the top surface of the steel tappet head, and continue the application of the heat for a sufficient length of time to convert the upper part of the cast iron plug into white iron and fuse or weld the same to the steel tappet head without, however, melting the lower end of the plug, and, in this manner, I am able to prevent the molten metal from flowing through the hollow of the tappet. The invention consists, therefore, in a composite metal article of manufacture, such as a valve tappet or poppet valve, having a hollow thin shelled steel shank and head portion, and a cast iron or white iron surface portion welded to the head portion of the tappet.

It further consists in a composite metal article of manufacture in which the surface portion (initially composed of a cast iron plug) has been converted into white iron, welded to the head portion of a hollow valve tappet or analogous article. It further consists in the several novel features hereinafter fully set forth and claimed.

The invention is clearly illustrated in the drawing accompanying this specification, in which—

Figure 1 is a central longitudinal section taken through a composite metal valve tappet and illustrating a simple embodiment of the present invention;

Fig. 2 is a side elevation of one form of cast iron plug used in forming the composite metal tappet;

Fig. 3 is a view, partly in side elevation and partly in central longitudinal section, of the steel shank and head portion of the tappet and showing this part of the tappet as it appears before the cam contacting surface has been welded thereto;

Fig. 4 is a view, partly in side elevation and partly in central longitudinal section, of the hollow steel shank and head portion and the cast iron plug assembled and showing the same held in a support during the welding operation;

Fig. 5 is an end view of the finished tappet seen in Fig. 1;

Fig. 6 is an end view of the steel tappet piece seen in Fig. 3; and

Fig. 7 is an end view, looking from below, of the cast iron plug seen in Fig. 2.

Referring to said drawing, and first to Fig. 1, which illustrates a completed valve tappet made in accordance with the present invention, the reference character 8 designates a thin shelled, hollow steel shank, which may be formed at one end with a thickened wall containing internal screw threads 9 for the reception of an adjustment stud as is customary, or it may be formed in any other desirable manner for engagement with the stem of a poppet valve or other device which is intended to be actuated by the tappet. On the other end of the hollow steel shank 8 is formed a steel head portion 10, to which is fused the cam contacting surface portion 11, which is composed of iron, and, as a preference, is composed of white iron, integrally united with the steel head portion 10 of the tappet.

In the finished tappet, the white iron cam contacting surface portion takes the form of a disk like part 12 which overlies the steel head portion 10 of the tappet and is integrally united therewith, the white iron portion of the disk being thickened at its middle portion as shown at 13 in Fig. 1, below which is a portion 14 which has not been converted from cast iron into white iron, but retains its original condition. It will be noted from the cross hatching appearing in Fig. 1, that the white iron disk like part 12 and part of the thickened portion 13 of the cam contacting surface portion of the tappet are integrally united with the steel tappet head, whereas the lower part 14 of the plug has not been melted, but remains in its original condition.

A composite metal valve tappet embodying the present invention is preferably constructed in the following manner. A steel blank for the shank and head portion (having a shape substantially as shown in Fig. 3) is first formed with suitable dies. It is then bored out from the head end to form the thin shelled hollow shank 8, having the relatively thick wall at the end opposite the head, and the end face of the head piece 10 is preferably machined to provide a depression 15 surrounded by a marginal rim 16. To provide a support for the cast iron plug 11$^a$ during the welding operation, the bore is enlarged at the head to provide a shoulder 17 below the head. The cast iron plug 11$^a$, preferably is formed with a disk like head part 12$^a$ and a short stem or neck 14$^a$, the stem or neck being of sufficient length to engage the shoulder 17 when assembled with the steel body portion of the tappet. The amount of metal in the disk portion 12$^a$ is calculated to completely fill the recess or depression 15 when melted.

After the pieces have been formed, the cast iron plugs are assembled with the steel pieces and the assembled pieces placed in a metal plate 18 (see Fig. 4) which forms one terminal of an electric arc welding circuit. The plate 18 contains a number of holes (one of which is shown in Fig. 4) through which the shank of the tappet extends and above the holes the upper face of the plate is recessed to form cavities, one of which is shown at 19, for receiving the head portion of the tappet. In actual practice a large number of tappets are placed in the plate 18 at a time, and the workman applies the arc welding tool to the plugs of the several tappets in succession. The arc welding tool is held upon the plug 11$^a$ until the metal thereof melts and flows out into the surrounding portion of the recess 15, and the tool is applied for a sufficient length of time to fuse the metal of the disk like portion 12$^a$ of the plug to the steel head of the tappet piece, this length of time being sufficient to convert the cast iron into white iron. When melted, the disk like part 12$^a$ usually assumes a crowned like appearance, as is illustrated by the dotted line 11$^b$ in Fig. 4.

It has been found that by properly gauging the length of time for applying the arc welding tool to the parts, that the upper or crowned portion of the plug is completely fused with the steel head portion 10, although the lower end 14$^a$ of the plug (see Fig. 4) is not fused, but remains seated upon the shoulder 17 thereby forming a closure for the hole in the shank for retaining the molten portion of the plug above it. In actual practice, the plate 18 and the shanks of the tappets are water cooled during the welding process, whereby the intense heat (to which the tappets are subjected) is rapidly conducted away from the tappets, which makes it possible to employ the lower portion of the cast iron plug as a closure for preventing the molten portion of the plug from flowing down through the hollow of the tappet shank.

It is understood that after the tappet has been formed as above described, the crowned white iron surface portion of the head is ground down to provide the desired cam contacting surface, and the remainder of the tappet is machined and finished as is well understood.

From the above it will be apparent that the iron cam contacting surface portion of the tappet is fused to the head portion despite the fact that the shank portion of the tappet is hollow at the time the iron portion is welded to the head. Furthermore, in a hollow tappet composed of a steel body and an iron cam contacting surface portion welded thereto, the shell or wall of the shank may be made very thin, although sufficient metal may be left in the shell or wall at the end opposite the head for receiving the threads for the adjustment stud.

More or less variation of the exact details of construction is possible without departing from the spirit of this invention. I desire, therefore, not to limit myself to the exact form of the contruction shown and described, but intend, in the following claims, to point out all of the invention disclosed herein.

I claim as new, and desire to secure by Letters Patent:

1. A composite metal article of manufacture comprising a thin shelled hollow steel shank having a steel head portion on one end and a relatively thick internally threaded wall at its other end, and a cast iron plug contained in the hollow of the headed end of said shank and having an iron portion extending over said steel head portion and integrally united therewith.

2. A composite metal valve tappet comprising a hollow thin shelled steel shank formed with a steel head portion at one end and a relatively thick internally threaded wall at its other end, and there being an internal shoulder in the hollow of the shank, below said head portion, and a cast iron plug contained in the hollow of the shank and contacting with said shoulder, the upper part of said plug being composed of white iron and overlying said steel head and integrally united therewith.

GEORGE R. RICH.